Patented Apr. 30, 1946

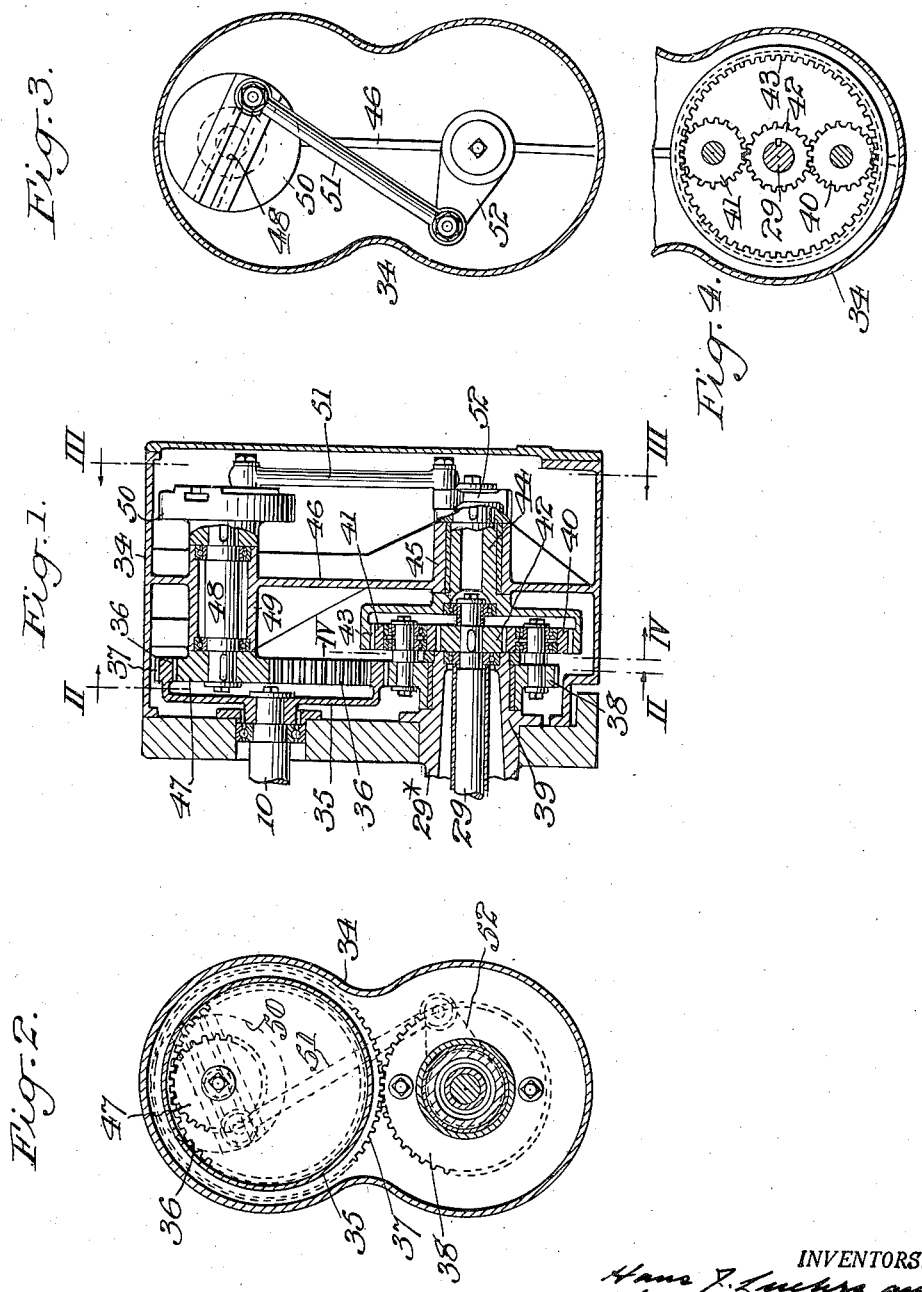

2,399,493

UNITED STATES PATENT OFFICE 2,399,493

CHANGE-SPEED MECHANISM

Hans J. Luehrs, Westerly, R. I., and Philip W. Cottrell, Stonington, Conn., assignors to C. B. Cottrell & Sons Company, Westerly, R. I., a corporation of Delaware Original application April 22, 1944, Serial No. 532,292. Divided and this application February 22, 1945, Serial No. 579,172

2 Claims. (Cl. 74—394)

The object of our invention is to provide a novel and efficient change speed mechanism which is particularly well adapted for forwarding sheets at a variable speed and in spaced relationship from a source of sheet supply to a sheet handling machine, as fully set forth in our co-pending application filed April 22, 1944, Serial No. 532,292, of which this application is a division.

A further object of our invention is to provide a change speed mechanism which includes a constant speed drive shaft, a variable speed driven shaft and a combination of operatively interconnected elements connecting the drive shaft with the driven shaft whereby the driven shaft may be slowed down and speeded up at desired intervals.

A practical embodiment of our invention is represented in the accompanying drawing, in which Fig. 1 represents a vertical central section through the change speed mechanism;

Fig. 2 represents a vertical cross section taken in the plane of the line II—II of Fig. 1, looking in the direction of the arrows;

Fig. 3 represents a vertical cross section taken in the plane of the line III—III of Fig. 1, looking in the direction of the arrows; and Fig. 4 represents a detail cross section taken in the plane of the line IV—IV of Fig. 1, looking in the direction of the arrows.

The drive shaft 10 of the change speed mechanism is driven at a constant speed from a suitable drive, not shown herein. The shaft 29 is driven at a variable speed from the drive shaft 10 as follows.

One end of the shaft 10 projects into a housing 34 where it is provided with a gear 35 having internal teeth 36 and external teeth 37. The external teeth 37 of this gear 35 mesh with a spur gear 38 rotatably mounted on an extension of one of the hollow studs 29* concentric with the driven shaft 29, which gear 38 carries eccentrically two small spur gears 40, 41 which mesh with a spur gear 42 keyed to the driven shaft 29. These small spur gears 40, 41 also mesh with the teeth of an internal gear 43, the hollow shaft 44 of which is pivoted to rock in a suitable bearing 45 of the partition 46 in the housing 34.

The internal teeth 36 of the gear 35 mesh with a spur gear 47 fast on one end of a shaft 48 rotatably mounted in a suitable bearing 49 of the said partition 46 of the housing. The other end of this shaft 48 carries a crank disc 50 adjustably connected to the upper end of a rod 51, the lower end of which rod is connected to an arm 52 fast on the shaft 44 which carries the internal gear 43.

The above described arrangement of the several cooperating elements of the change speed mechanism produces a very simple and effective means for slowing down and speeding up the driven shaft at the desired intervals, rendering the mechanism particularly well adapted for use in connection with sheet feeding mechanism, as hereinbefore referred to.

It is evident that various changes may be resorted to in the construction, form and arrangement of the several parts without departing from the spirit and scope of our invention and hence we do not intend to be limited to the particular embodiment herein shown and described, but what we claim is:

1. A change speed mechanism including a constant speed drive shaft, an externally and internally toothed gear thereon, a driven shaft, a spur gear thereon, a spur gear concentric with the driven shaft and meshing with the external teeth of the drive shaft gear, a rotary crank shaft, a spur gear thereon meshing with the internal teeth of the drive shaft gear, an oscillating shaft having an arm operatively connected to the crank shaft, an internal gear on the oscillating shaft, and spur gears carried by the said concentric gear and meshing with the said internal gear on the oscillating shaft and said spur gear on the driven shaft.

2. A change speed mechanism including a constant speed drive shaft, an externally and internally toothed gear thereon, a driven shaft, a spur gear thereon, a spur gear concentric with the driven shaft and meshing with the external teeth of the drive shaft gear, a rotary crank shaft, a spur gear thereon meshing with the internal teeth of the drive shaft gear, an oscillating shaft having an arm, a rod connecting it with the crank shaft, an internal gear on the oscillating shaft, and spur gears carried by the said concentric gear and meshing with the said internal gear on the oscillating shaft and the said spur gear on the driven shaft.

HANS J. LUEHRS.
PHILIP W. COTTRELL.